Patented Apr. 10, 1951

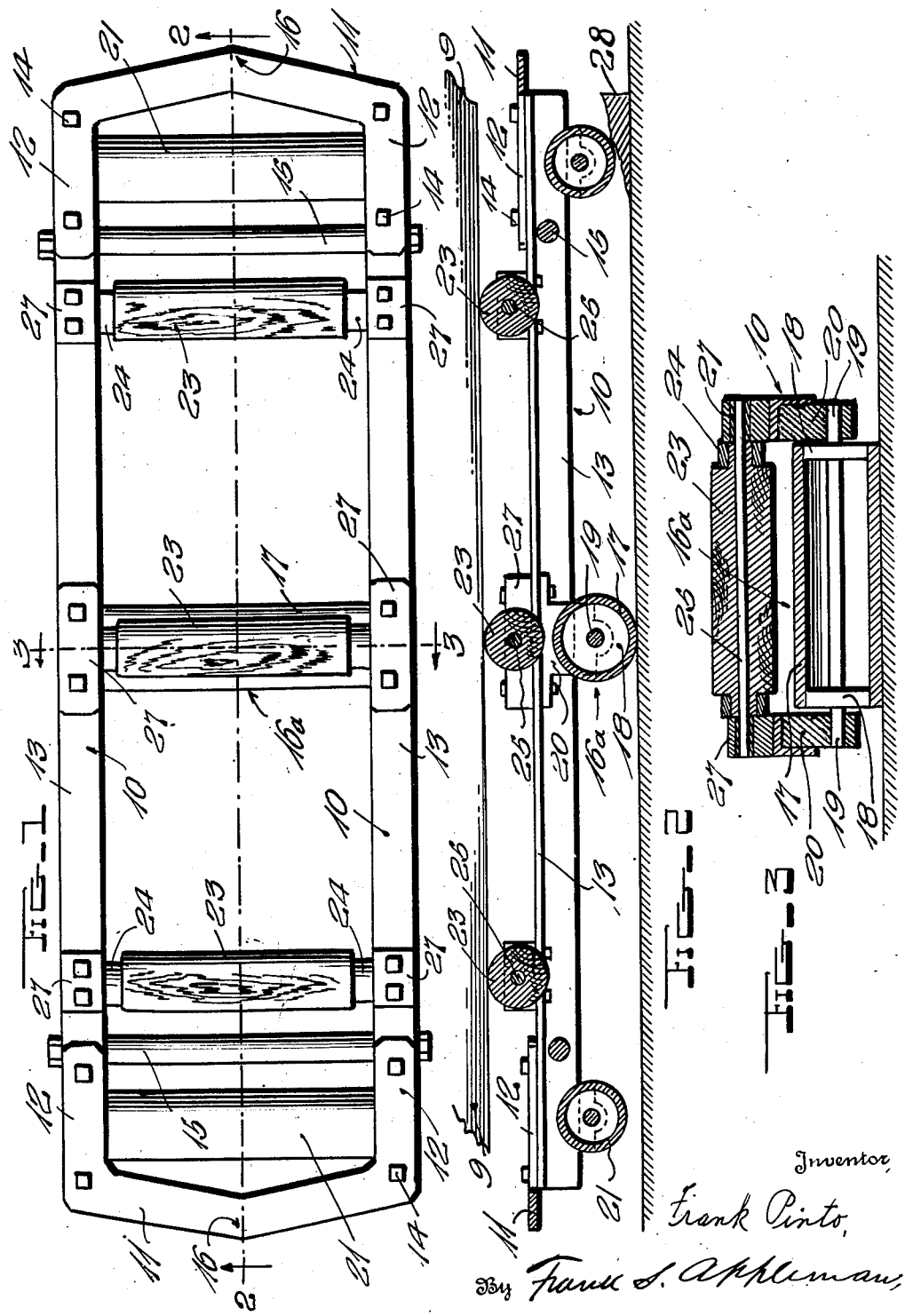

2,548,054

UNITED STATES PATENT OFFICE 2,548,054

DOLLY FOR MOVING AND HANDLING BLOCKS OF GRANITE

Frank Pinto, Barre, Vt., assignor of one-half to José M. Monte, Barre, Vt.

Application March 15, 1946, Serial No. 654,721

1 Claim. (Cl. 280—61)

My invention relates to a machine for moving heavy, large blocks of granite or marble, especially as used for monuments, whether finished or unfinished. This truck is also useful in handling other large, cumbersome articles such as ice blocks and the like.

The truck is very simple in construction, but of great strength and is provided with a set of rollers on its flat top to facilitate the placing of the heavy object thereon and for taking it off. On the underside of the truck a single wide wheel or roller is placed in the middle thereof for transporting truck and the load together from one place to another by easy handling. There are three rollers, the end ones being smaller than the middle one so as to make it possible to change easily the direction in which the load is being carried.

As a matter of fact, a single person can operate the truck with a load of 3,000 pounds with ease to transfer a block along a given length of ground, whereas an ordinary wheeled truck would have to be drawn by a horse or operated by crane or some other cumbersome device.

Ordinarily, when it is desired to place a monument in a cemetery, it must be transported from the factory on a truck, using planks six or seven feet long placed on the ground, with a number of loose rollers on the planks in order to set the stone in its right place. After depositing the stone on these rollers, it is pushed forward four or five feet, then the planks are moved ahead of the stone with smaller rollers being substituted on top and the procedure repeated until the monument is lowered into its right place.

All that is necessary in using my device is to place the planks on the ground, between the truck and the place where the stone will finally rest, and the stone on my truck is then pushed right to the location determined because my truck is so made that the stone can be lowered into place directly from the truck without more.

This machine can be operated from either end and in any desired direction, since it is balanced on a single central bottom roller and can easily be swung to right or left by the operator. No other machine of this kind is known to be used in the granite trade.

This truck has also great use in the sandblast room. For this kind of work, it is now necessary that a jack be used, run by hydraulic pressure. The stone is first lifted onto a platform and the jack pushed under the platform and all pushed into the sandblast room, and finally dragged out when the work is completed. The fact that the stone is thus lifted high in the air makes working very difficult. Moreover, it can only be operated from one side because of the hydraulic equipment on the opposite side.

By the use of my truck, the stone rests very low and is easily maneuvered into the sand blasting room.

These and other objects and advantages will be understood from the subjoining description and the attached drawings.

One embodiment of the invention is illustrated in the drawings in which like numerals denote the same details:

Figure 1 is a top plan view of the moving truck;

Figure 2 is a vertical section taken on a plane along line 2—2 of Fig. 1; and

Figure 3 is a transversal section taken on a plane along line 3—3 of Fig. 1.

Numeral 10 denotes a rectangular steel or iron frame reinforced by a U-shaped cross piece 11 having inwardly directed arms 12 secured to each side member 13 of the frame 10 by bolts 14. A cross-bar or tie member 15 connects the side members 13 at each end of the frame to prevent it from spreading in which function the cross piece 11 assists. The latter has an outwardly directed hump 16 which acts as a bumper when the truck meets an obstacle.

On the underside of the frame 10 which may be made of angle iron is provided in the middle thereof a drum-like wheel or main roller 16a adapted to alone support the entire weight of the truck loaded. This main roller consists of a heavy iron tubing 17 extending the entire width between the long side members 13 of the frame. At each end of this tube 17 inserted tightly therein a metal bushing 18 is mounted on an axle 19 which is supported at each end by a bearing 20 secured under the side members 13 of the frame.

At each end of the frame 10, a roller 21 is positioned. Each roller 21 is similar in structural detail to the main roller 16a, although it can be seen in Figure 2 that the rollers 21 are of lesser diameter than the roller 16a. It will be clear from Fig. 2 that with the truck in horizontal position, the middle or main roller 16a carries all the weight, because the end rollers are then lifted off the ground. This makes the running and turning of the truck, as well as steering, much easier and the comfortable handling of a heavy load 9 possible for a single person. The smaller end rollers permit only a slight tilting forward or rearward to facilitate loading and unloading of a block.

On top of the frame 10 are shown three load carrying rollers 23 equally spaced between its ends. They are made preferably of solid hard wood or plastic with reduced ends which carry reinforcing steel collars or rings 24 at their ends. A shaft 25 is provided for each top roller 23 which is supported in suitable metal bearings at its ends with bushings 27. These top rollers 23, are all of one diameter with their top surfaces level. By this means, the handling of the load 9 is made easy. When unloading with one end roller 21 touching the ground, it is advisable to put a wedge as at 28 under the other end roller to keep the truck steady and prevent tilting.

It should be noted that, as both ends are alike either one may constitute the front end.

It is to be understood that many variations from that disclosed and shown may be made within the scope of the subjoined claim.

I claim:

In a truck for handling and transferring stone blocks, a frame including a pair of spaced apart parallel side members, a tie member extending transversely of and secured to the side members adjacent the ends of said side members, a bumper attached to the side members at each end thereof and extending longitudinally outwardly beyond the ends of each side member, a plurality of transversely extending wooden load bearing rollers journalled on said side members and projecting above the top of the side members, a single traction roller rotatably supported by the side members at a point below the side members, and a roller extending transversely of and journalled in the side members in proximity to the ends of said side members and being of lesser diameter than the traction roller whereby said rollers will limit the extent to which the truck may be tilted, the said traction roller and end rollers each comprising an axle rotatably supported by and depending from the said side members, a heavy metal tube surrounding the axle of such length as to extend between the side members, and a bushing on said axle at each end of the tube for securing the tube to the axle.

FRANK PINTO.

REFERENCES CITED

The following references are of record in the file of this patent:

UNITED STATES PATENTS

| Number | Name | Date |
|---|---|---|
| 511,793 | Philion | Jan. 2, 1894 |
| 612,029 | Forcier | Oct. 11, 1896 |
| 682,663 | Bayley | Sept. 17, 1901 |

FOREIGN PATENTS

| Number | Country | Date |
|---|---|---|
| 11,346 | Great Britain | May 23, 1896 |
| 346,770 | France | Feb. 9, 1904 |